United States Patent
Gibbs et al.

(10) Patent No.: US 9,305,467 B1
(45) Date of Patent: Apr. 5, 2016

(54) CUSTOMIZABLE MEDIA CONTENT SYSTEM FOR AN ARTICLE

(71) Applicants: Douglas P. Gibbs, Yuba City, CA (US); Crystal D. Martin, Yuba City, CA (US); Andy H. Gibbs, Palm Springs, CA (US)

(72) Inventors: Douglas P. Gibbs, Yuba City, CA (US); Crystal D. Martin, Yuba City, CA (US); Andy H. Gibbs, Palm Springs, CA (US)

(73) Assignee: OutLOUD, LLC, Yuba City, CA (US)

( * ) Notice: Subject to any disclaimer, the term of this patent is extended or adjusted under 35 U.S.C. 154(b) by 590 days.

(21) Appl. No.: 13/707,246

(22) Filed: Dec. 6, 2012

Related U.S. Application Data

(60) Provisional application No. 61/630,186, filed on Dec. 6, 2011.

(51) Int. Cl.
*G09F 1/00* (2006.01)
*G06Q 30/06* (2012.01)

(52) U.S. Cl.
CPC .............. *G09F 1/00* (2013.01); *G06Q 30/0621* (2013.01)

(58) Field of Classification Search
CPC ... G06Q 30/00; G06Q 30/0621; G06Q 30/06; B42D 15/022
USPC ................ 705/26.1, 26.5; 40/124.03
See application file for complete search history.

(56) References Cited

U.S. PATENT DOCUMENTS

| | | | | |
|---|---|---|---|---|
| 9,031,869 | B2* | 5/2015 | Glass ................. | G06Q 30/0621 705/26.5 |
| 2011/0078931 | A1* | 4/2011 | Sapp .................... | B42D 15/022 40/124.03 |
| 2012/0000100 | A1* | 1/2012 | Jin ........................... | A63H 5/00 40/124.02 |
| 2012/0011751 | A1* | 1/2012 | Schimke .............. | B42D 15/022 40/124.03 |
| 2012/0123895 | A1* | 5/2012 | Horvitz ........................ | 705/26.5 |

OTHER PUBLICATIONS

Buckley et al, "Computer controlled machine for vending personalized products"; http://search.proquest.com/docview/1741643317?accountid=14753.*

* cited by examiner

*Primary Examiner* — Mila Airapetian
(74) *Attorney, Agent, or Firm* — Neustel Law Offices; Michael S. Neustel

(57) ABSTRACT

A customizable media content system for an article for allowing a consumer to customize one or more types of media within a card. The customizable media content system for an article generally includes selecting a card by a customer, selecting a first media module by said customer, wherein said first media module includes a first media content and assembling said first media module with said card by the customer.

18 Claims, 14 Drawing Sheets

CUSTOMIZABLE MEDIA CONTENT SYSTEM FOR AN ARTICLE

CROSS REFERENCE TO RELATED APPLICATIONS

I hereby claim benefit under Title 35, United States Code, Section 119(e) of U.S. provisional patent application Ser. No. 61/630,186 filed Dec. 6, 2011. The 61/630,186 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to the field of greeting cards, political campaign promotional materials, and marketing materials. Specifically, the invention teaches a new and novel method, system and apparatus of creating and assembling one or more multimedia cards at a point of sale location, online, or a "brick and mortar" location. The invention allows a person to select a separate multimedia module (e.g. audio module, light module, movement module, and/or video module) and affix to a greeting card, promotional piece, or marketing material. Thus allowing the combined piece to deliver a multimedia message to the recipient when activated by a mechanically activated, light activated, motion activated, or sound activated means.

2. Description of the Related Art

Any discussion of the related art throughout the specification should in no way be considered as an admission that such related art is widely known or forms part of common general knowledge in the field.

As will be seen, history has laid a vast trail of products and patents relating to greeting cards that incorporate audio or video messages along with a traditional paper card. The objective of joining a traditional paper greeting card with a multimedia element is to enhance the emotional depth of the message, and create a multi-sensory experience for the recipient.

To that end, greeting cards manufactured with an integral electronic circuit and user interface features, such as a speaker, microphone, video screen, or other multimedia interfaces to deliver the multimedia message are well known and have been available for years.

The greeting card business is huge. Grocery stores, drug stores, florists, gift stores and convenience stores have, for decades, made available very large displays containing thousands of variations of greeting cards. In some larger displays, cards are organized by intended recipient, for example, grandma, son, daughter, mother, boss, or retiree, and in other card displays, cards are organized by particular holidays or events, for example, Christmas, birthday, anniversary, retirement, or get well.

The seemingly exhaustive and increasingly large selection of the myriad card types require retailers to invest heavily in maintaining a large inventory. Further, retailers experience significant losses associated with slow-selling or non-selling cards, holiday greeting cards that must be removed after the holiday season, shipping costs, and most importantly, the cost associated with facility rent of 100s or 1,000s of square feet of floor space needed to display so many cards.

Multimedia cards indeed deliver new and joyful experiences to the card recipients, and they create new revenue channels for card manufacturers and retailers. However, a major drawback to manufactured multimedia greeting cards is that retailers must invest more money and more floor space to display the expanded card product line, further exacerbating the challenge to add even more inventory while maintaining profitability.

Yet, another major drawback is that manufacturing a greeting card with pre-determined graphics, combined with a standardized pre-recorded multimedia module, creates an even greater risk of not matching the combination of printed and multimedia message that satisfies a buyer's preference. In many cases, the graphics of the card may be appealing, but the voice or sound message is not. Or, the audible voice message may be the perfect soothing voice of comfort, but the card graphics are not appealing to the buyer.

Yet another major drawback is the standard manufacturing method of multimedia enhanced greeting cards. Currently, the audio or video module is concealed with an extra flap of paper, requiring additional print and assembly costs.

All of these weighty problems associated with large inventory management, costly floor space, and additional print and assembly costs can be ameliorated if a multimedia module and greeting card are sold separately, thus allowing the customer to combine a selected card with a selected multimedia module. When assembled together, the card plus module becomes a unique and novel product. By not requiring the customer to buy one of the many pre-combined greeting cards, but offering cards that can be mated, the retailer realizes more sales, fewer losses from cards that don't sell, and a higher annual sales per square foot of retail space. In practice, a retailer would be offering many more card options with a much smaller inventory compared to the very high greeting card inventory levels that consume much more retail floor space.

Further, in the highly competitive environments of political campaigning and marketing, there exists a perpetual drive by politicians and marketers to create brand differentiation, and brand preference. This drive creates two distinct time periods during which brand development is most important: 1) prior to the "sale" with the sale being defined as point at which the customer decides on the product or service—or in the context of political campaigns, the point at which a political constituent decides to vote for a candidate or initiative, and 2) after the sale, to reinforce the attributes of the brand of product or service selected by a consumer—a "thank you for selecting Company XYZ" message, for instance.

One proven means of creating differentiation between products, candidates, and brands is the multi-sensory presentation of materials to the buyer or voter. The five human senses include sight, sound, smell, touch, and taste. Practically speaking, the overwhelming choice of promotional materials includes sight for printed materials and television, and sound for television and radio. However, a novel method to stimulate consumer or constituency decisions is to incorporate personalized multimedia content into traditional physical materials such as marketing materials, and campaign collateral.

BRIEF SUMMARY OF THE INVENTION

It should be noted that in the description of the present invention, that the phrase "multimedia module" interchangeably may mean "sound module", "light module", "motion module", "video module" or any combination of these. For example, a sound module may or may not contain light. The references to sound, light, motion and video relate to multimedia messages that are intended to stimulate two primary human senses: sight and hearing. The reference to "multimedia module" may also mean a "sound module" or "video module" that is blank or partially blank and allows for the consumer to self-record their own message or upload their own audio or video file.

It should also be noted that the terms "greeting card" and "article" whenever mentioned shall mean a material that is flat (e.g. unfolded) or folded, printed with graphics, text or both, and which is may be inserted into an envelope for mailing or delivering to a recipient. However, the configuration may be a celluloid material, thermoplastic or woven fabric, and may be of a configuration such as a postcard or a folded self-mailer that is not intended to be inserted into an envelope for delivery.

At least one exemplary embodiment of the present invention is to create a point of sale system and method whereby a customer may select separately a greeting card from offerings and after purchase, assemble the module onto the greeting card to produce a custom multimedia greeting card. The multimedia modules would be light-activated and shaped like an object that relates to the theme of the greeting card offerings. For example, Mother's Day greeting cards would be displayed with a selection of multimedia modules shaped like flowers, each flower selection playing a different song. The consumer affixes the chosen flower-shaped module into the card, removes the light-activated sensor cover, allowing the module to automatically start playing the selected song every time the card is opened. Further examples of offerings include a selection of tie-shaped modules with various manly songs for Father's Day, egg-shaped modules with various spring songs for Easter, and Christmas tree-shaped modules with various carols for Christmas, etc.

In another exemplary embodiment of the present invention is to create a point of sale system and method whereby a customer may select separately a greeting card and a multimedia module, cause to be uploaded onto the multimedia module a video, a song, a voice message, a sound effect, or other multimedia content created by or desired by the customer, dispensing the multimedia module and greeting card separately to allow the customer to subsequently assemble the multimedia module onto the greeting card to produce a custom multimedia greeting card at the point of sale.

Yet another exemplary embodiment of the present invention is to create a point of sale system and method whereby a customer may select separately a greeting card from offerings and a recordable multimedia module from offerings, and after purchase, record a personal message onto the module and assemble the module onto the greeting card to produce a personalized multimedia greeting card that will play back to the recipient upon opening.

Yet another exemplary embodiment of the present invention is to create a point of sale system and method to allow a customer to purchase a plurality of identical multimedia greeting cards containing their customized multimedia modules. For example, creating 100 wedding invitations that contain affixed wedding-bell shaped sound modules that play the couple's personal audio message, or favorite song, to guests when opened.

Yet another exemplary embodiment of the present invention is to create a multimedia greeting card with a cut-out shaped like the multimedia module to allow for the multimedia module to project past the plane of the greeting card paper.

Yet another exemplary embodiment of the present invention is to create a system and method to allow for a customer to create a campaign or marketing piece consisting of a printed piece and multimedia module that is shaped, covered, or printed on in a way to blend with the surrounding print. For example, a printed marketing piece that includes a picture of a field of flowers, where a portion of the field is the actual sound module affixed to the piece, covered with a graphic that blends into the surrounding print.

Yet another exemplary embodiment of the present invention is to create a software application to be installed on consumer hand held and portable electronic devices to facilitate greeting card and multimedia selection, ordering, payment and purchasing of a custom multimedia greeting card through the use of their hand-held or portable device.

Yet another exemplary embodiment of the present invention is to provide a mechanically activated, light activated or sound activated switch means to activate the playback of content on a multimedia module.

These and other embodiments will become known to one skilled in the art, especially after understanding the significant commercial advantages of separate multimedia modules and greeting cards over traditional, embedded, manufactured multimedia greeting cards. The present invention is not intended to be limited to the disclosed embodiments. There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 12 is a front view of a display rack supporting a plurality of media modules and a plurality of articles for a consumer to select from.

DETAILED DESCRIPTION OF THE INVENTION

Figure 1:
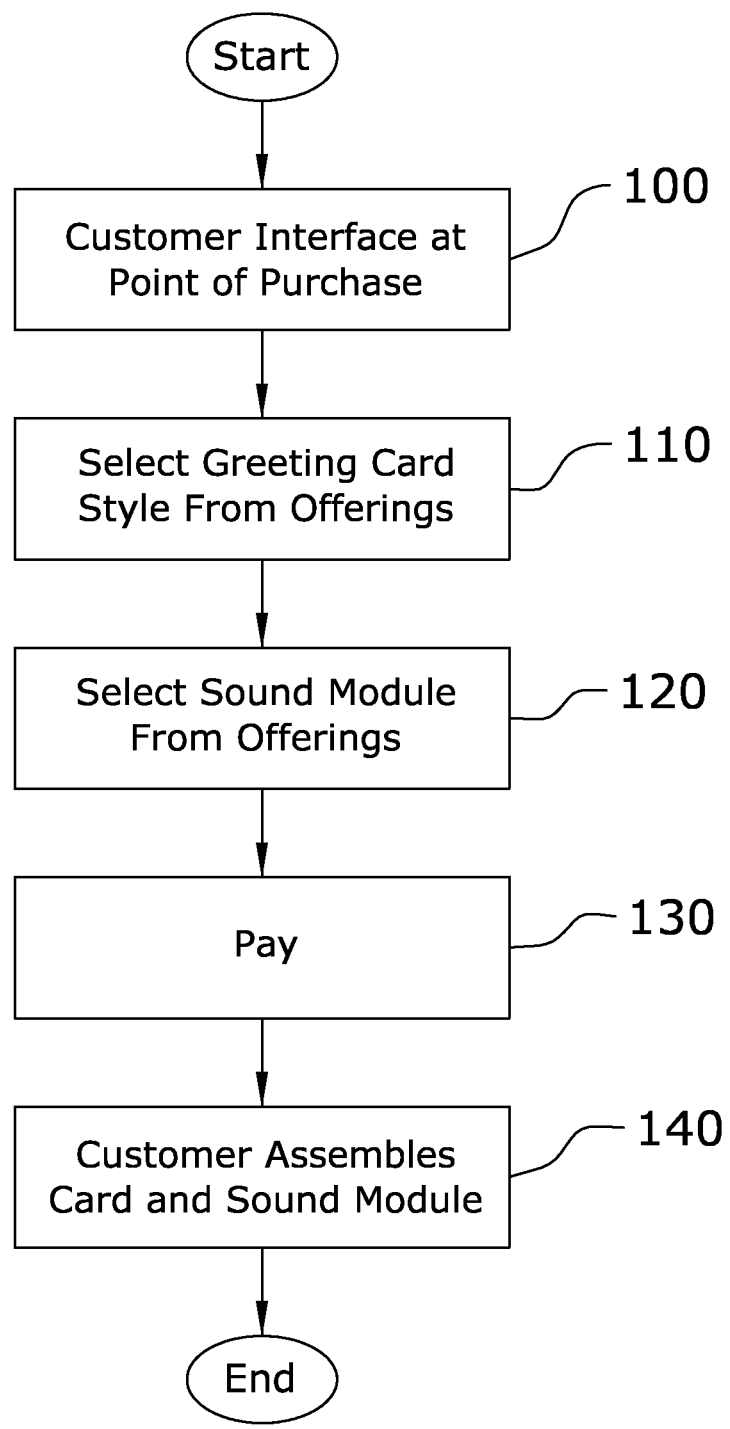
FIG. 1 is an exemplary diagram showing one variation of the method and process of purchasing a separate multimedia module and greeting card at a point of sale.

Various aspects of specific embodiments are disclosed in the following description and related drawings. Alternate embodiments may be devised without departing from the spirit or the scope of the present disclosure. Additionally, well-known elements of exemplary embodiments will not be described in detail or will be omitted so as not to obscure relevant details. Further, to facilitate an understanding of the description, a discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments" is not exhaustive and does not require that all embodiments include the discussed feature, advantage or mode of operation.

It should be noted that an audio file wherever referenced herein, can mean any uncompressed audio formats, such as WAV, AIFF, AU or raw header-less PCM, any lossless compression formats such as FLAC, Monkey's Audio, WavPack, TTA, or ATRAC, any advanced lossless compression file type such as Apple Lossless, MPEG-4 SLS, MPEG-4 ALS, MPEG-4 DST, Windows Media Audio Lossless (WMA Lossless), and Shorten (SHN), any formats with lossy compression such as MP3, Vorbis, Musepack, AAC, ATRAC or Windows Media Audio Lossy (WMA lossy), or any other readily available audio format known or unknown whether or not listed, or that may become available in the future as a result of the logical evolution digital technology.

Further, a video audio file wherever referenced herein, can mean any digital video format such as MPEG-4, WMV, MOV, or any other readily available audio format known or unknown whether or not listed, or that may become available in the future as a result of the logical evolution digital technology.

Still further, the term "greeting card" or "card" is not meant to be limiting, and as will become obvious to those skilled in the art, promotional cards with multimedia modules are used for the marketing of products or services for myriad industries. For example, casinos to draw customers back to the casino, by non-profit groups to raise money, by politicians to urge constituent support, etc. In particular, the term "card" is utilized within the present application to mean any physical article that provides information to another such as a greeting card, promotional material, promotional card, marketing material, political advertising material and the like.

The present invention generally includes an offering of two or more standard greeting cards, an offering of two or more sounds stored upon a database or digital memory device, two or more read/write sound modules, an apparatus located at a retail point of sale thorough which a customer may select one greeting card, and one sound module, cause to be loaded onto the sound module one of the offered sounds, or a sound of their creation, the purchase of a greeting card and a sound module, and the dispensing of a separate greeting card and sound module for assembly by or for the customer into a single multimedia greeting card assembly.

Finally, a multimedia module means an electronic assembly comprised of an electronic circuit, a power source, a switch that, when closed, activates the playback function, however, this definition is not intended to be limiting, and many other circuits may provide equivalent switch and playback function.

FIG. 1 is an exemplary diagram showing one variation of the method and process of purchasing a separate multimedia module and greeting card at a point of sale. Within a retail facility, a customer approaches a greeting card Point of Purchase display 100, and prepares to purchase a card. As a first selection process, the customer will select 110 a greeting card from an inventory of different greeting cards. As a second selection process, the customer will select 120 a sound module from offerings.

It should be noted that this embodiment may allow a customer to select the sound module 120 before selecting a card 110. Further, the customer may elect to purchase only the sound module 120. The methods described for visual, non-audible selection are not intended to be limiting.

The sound, as referred to throughout the present invention, may include songs, sound effects, human or computer generated voice messages, a combination of any of these sounds, or any other imaginable sound, audible or inaudible to a human, that a person may desire attaching to a greeting card. For instance, a greeting card that may be created for or by a person who desires the creation of a card for a dog birthday party may elect to include sounds in the 25,000 Hz to 60,000 Hz range. Since the human hearing range does not extend beyond 20,000 Hz, such a sound could be heard by a dog, but not by a human. Therefore, the sound may be of any recordable frequency.

Still further, it is obvious that although there is an inference of the point of purchase display 100 being located within a brick and mortar facility, the retail facility may as easily be a virtual facility such as a website accessible via the Internet.

Figure 12:
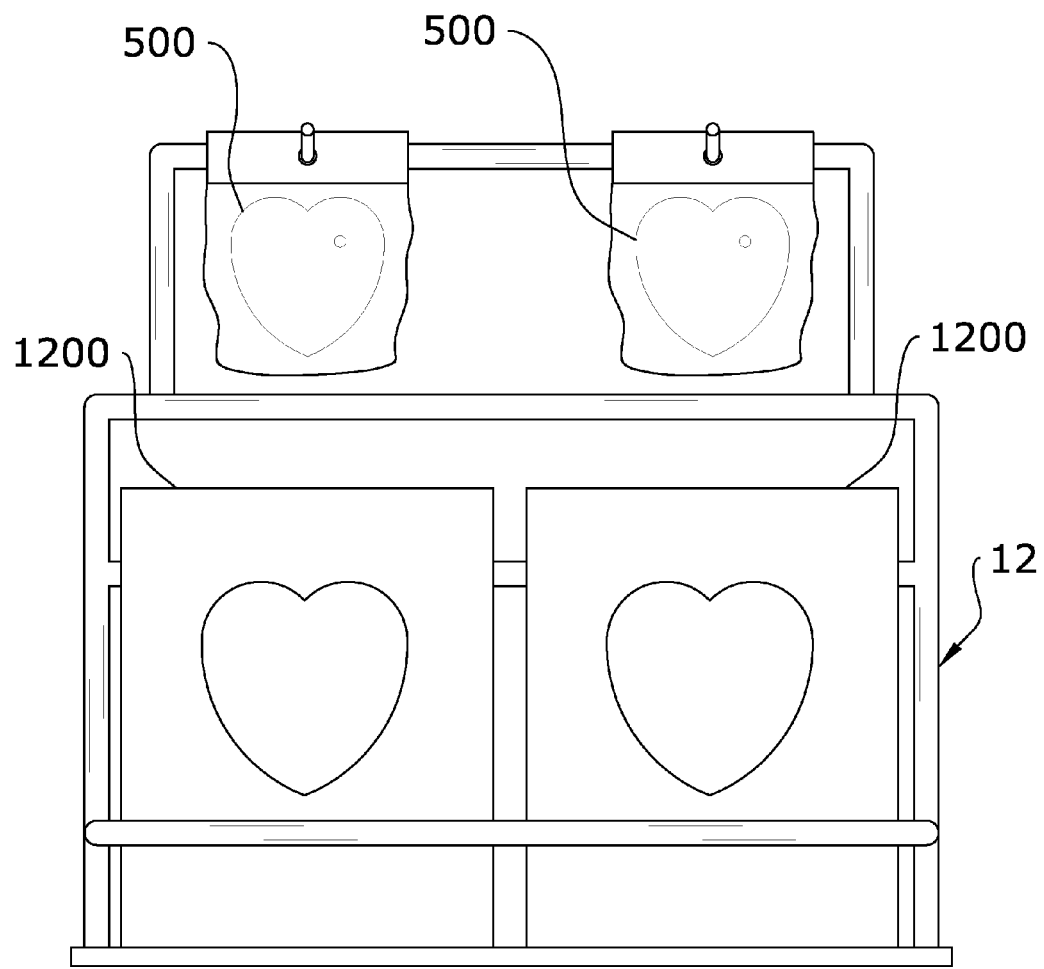

The embodiment therefore describes a Point of Purchase display 100 that contains more than one version of a greeting card from which a customer may select 110, and more than one sound module 120, the card and sound module thereafter being physically attached together by the customer 140 as a multimedia card. FIG. 12 illustrates an exemplary display rack 12 that is adapted to support the plurality of articles 1200 and the plurality of media modules 500.

If the point of purchase is located in a physical facility, the customer would typically pay 130 for the sound module and card before proceeding to attach them 140. This prevents unsellable inventory from being created in the event that the customer later abandons the purchasing process. However, this sequence is not meant to be limiting, and some instances may allow the customer to pay for the card or module after affixing. It should be noted that wherever reference is made to processes sequenced after the customer pays, the payment could occur at any point within the overall sequence of creating and assembling a sound card.

Traditionally, multimedia greeting cards, which are well known in the industry, are offered as pre-recorded physical greeting cards with prerecorded digital media integrally attached, and as a single assembly, are stored on a large greeting card display. Because of the large number of inventory items that a greeting card retailer must have available for birthdays, holidays, weddings, get well messages and more, the physical space required for displaying the inventory in a retail store may consume many hundreds of square feet of floor space.

The advantages of the present invention provide the ability for a physically small point of purchase display to contain a large number of printed cards, and a practically unlimited number of multimedia modules that can be attached to any one of the card styles. The efficiency of not stocking cards already containing an integrated digital media is that every customer may create a custom card-sound combination on demand. To briefly illustrate one advantage of the present invention, consider that the present invention may contain a physical space of nine square feet and allow customers to create more than 10,000 greeting card combinations, while a traditional greeting card display containing only 1,000 greeting card with prerecorded sound combinations would require more than 300 or 400 square feet of floor space.

Figure 2:
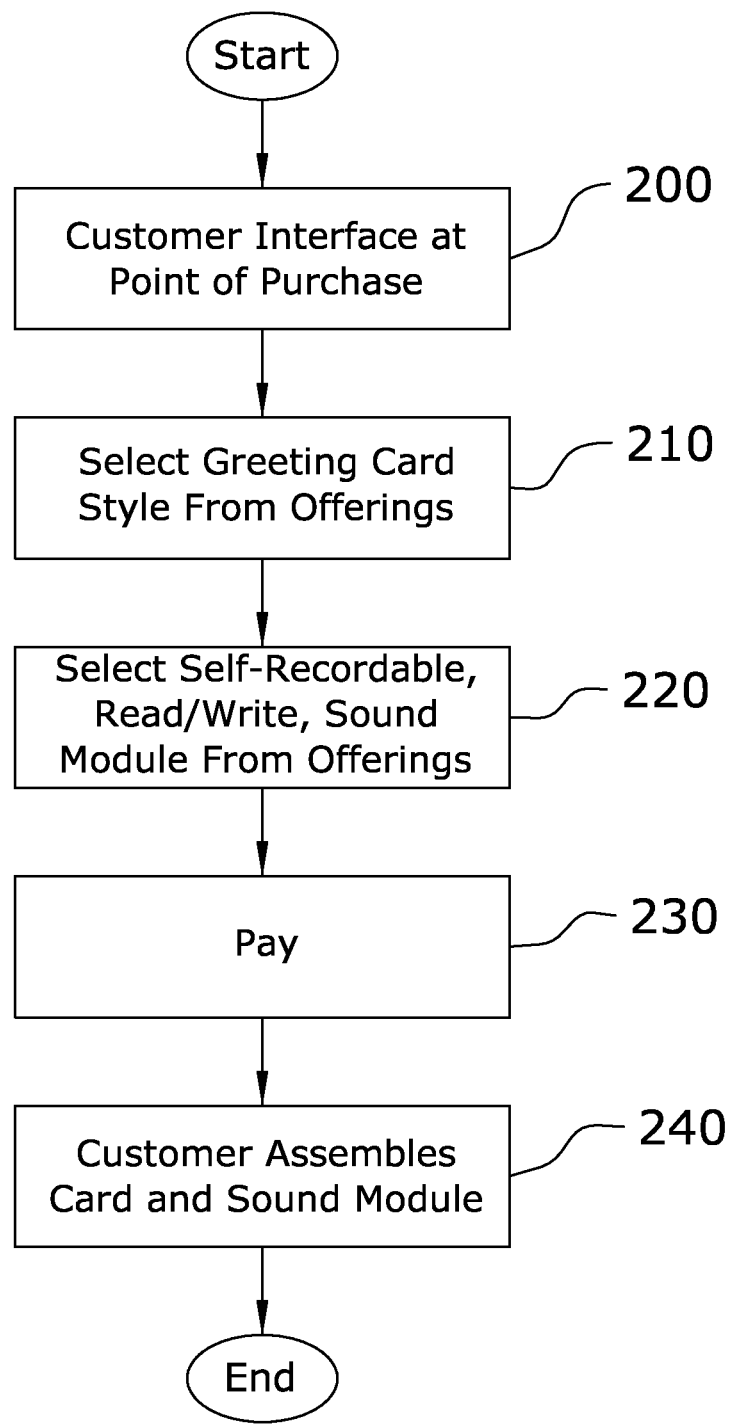
FIG. 2 is an exemplary diagram showing one variation of the method and process of purchasing a separate self-recordable multimedia module and greeting card at a point of sale.

FIG. 2 is an exemplary diagram showing one variation of the method and process of purchasing a separate recordable multimedia module and greeting card at a point of sale. Similar to FIG. 1, the customer interfaces at the point of purchase display 200 and selects a card from the offerings 210. The customer then chooses from a selection of self-recordable sound modules 220, with the intention of recording their own personal message on the module. The customer pays 230, then records their message on the module and assembles the module in the card 240.

The self-recordable sound modules can still come in various shapes and designs. For example, a birthday card display for girls could hold several self-recordable modules in the shape of different fairies. The customer would choose the fairy they liked the best to include in the card.

Figure 3:
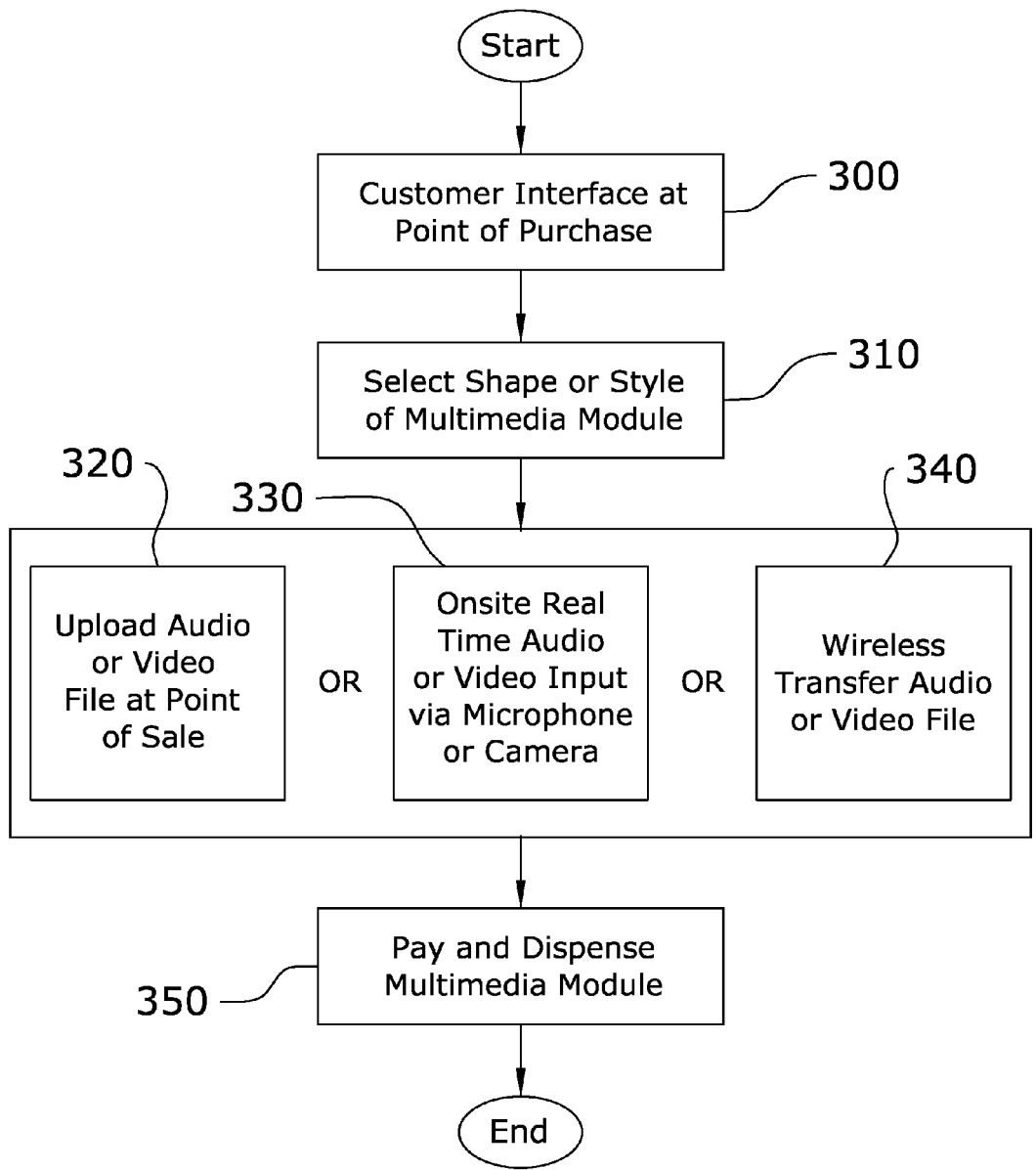
FIG. 3 is an exemplary diagram showing one variation of creating and transmitting a multimedia file for uploading onto a customized multimedia module

FIG. 3 is an exemplary diagram showing one variation of creating and transmitting a multimedia file for uploading onto a customized multimedia module. Although an audio file and sound module is referenced, the embodiment also anticipates that a video file and video module may be used.

In one embodiment, a customer interfaces with a point of purchase display 300, selects the type, design, or shape of sound module 310, and a customer may upload a multimedia file 320 into the point of purchase device, such prerecorded audio file being one that the customer has brought with them on a computer, smartphone, digital camera, flash drive, or other device upon which a digital file may be stored. Alternatively, a customer may desire to create a new audio file by instantly recording a sound 330 using a microphone associated with the point of purchase display system, or by recording a movie by using a digital camera in communication with the point of purchase display.

Transfer of the sound between a device upon which a prerecorded sound is stored, to a temporary storage device on the point of purchase display as a personal audio file may also be conducted using wireless communication 340. Alternatively, an audio file may be transferred directly to a sound module, obviating the intermediate step of transferring the audio file to a temporary storage means prior to subsequent transfer to a sound module.

The process of transferring and recording a digital file upon a storage means for subsequent recording on a portable media, such as a multimedia module of a custom greeting card are well known. As a non-limiting example, although not explicitly described, this process may include a sequence comprised of a user transferring a recorded digital file from a portable device into a multimedia greeting card production means of the present invention. The digital file, which may be one of a great number of formats, is processed through software that converts the file type into a standardized file type used to record the digital file onto a multimedia module. After conversion to a standardized file type, the digital file is ultimately recorded upon the multimedia module for later attachment to a greeting card. The method of audio file transfer described in this embodiment is meant to be illustrative of typical audio file transfer methods, but is not intended to be limiting. Further, audio file as used in this specification may also mean a video file, or multimedia file.

Figure 4:
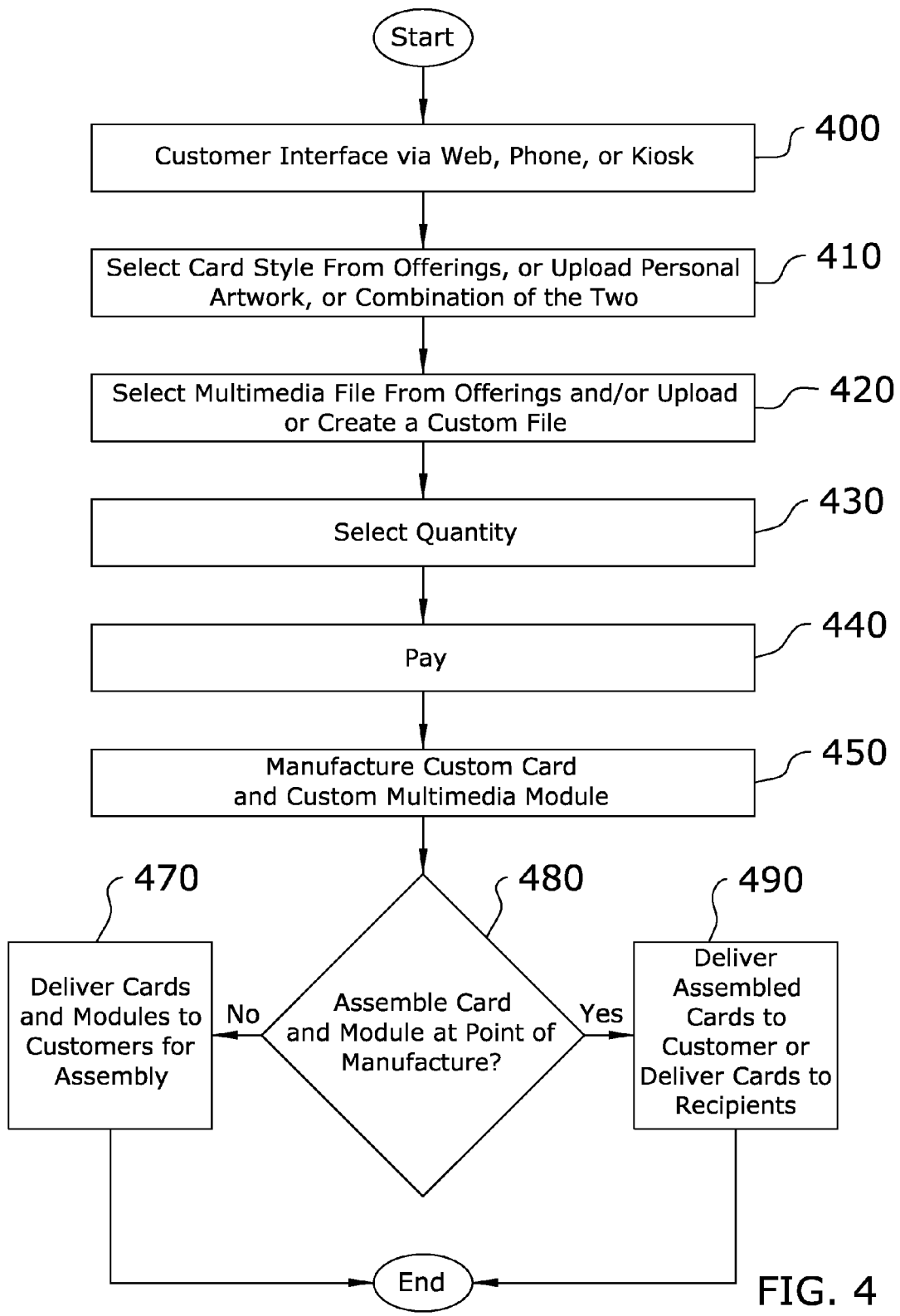
FIG. 4 is an exemplary diagram showing one variation of the method and process of purchasing multiple copies of a custom greeting card using a means of purchasing remotely.

FIG. 4 is an exemplary diagram showing one variation of the method and process of purchasing multiple copies of a custom greeting card using a means of purchasing remotely. Customers may desire more than one copy of a custom card and sound combination. For instance, a politician running for office wants to send a unique fundraising invitation to 10,000 donors across the country, that plays his own voice when opened. Traditional multimedia sound cards are cost prohibitive, but the reduced print and assembly cost of the present invention make large quantities of talking cards a viable marketing tool for the campaign. He uploads his artwork, sound, and donor mail list through a website interface, and the multimedia cards are produced and directly mailed to his donors.

A customer first approaches the customer interface 400 to begin the purchasing process. The customer interface may be at a physical point of purchase display 100, or a digital interface accessible through the web, phone, or a kiosk. The customer selects a card style from the offerings, or uploads their personal artwork, or a combination of the two 410. Then the customer selects a multimedia file 420 from a selection, or uploads, or creates their own.

Upon satisfactorily completing their card and multimedia file combination, the customer selects the number of custom greeting cards 430 they would like to be manufactured. After the customer's order is ready to process, the customer pays 440 a calculable amount of money prior to the production and delivery of the card components.

Following approved payment, the custom order is queued into a manufacturing process. The greeting card style 450 selected by the customer will be printed in the quantity ordered, or if a pre-printed card is selected, a person processing the order will count out the number of preprinted cards equal to the quantity ordered.

A second process is also conducted to manufacture the required number of multimedia modules 460, all of which will contain the same digital media selected or provided by the customer.

Following the production or selection of the greeting cards 450 and the corresponding number of custom sound modules 460, either process of which may be conducted in any sequence or simultaneously, the multimedia modules and greeting cards are either delivered to the customer for self-assembly 470 or assembled by the manufacturer 480, then delivered to the customer or directly distributed (by mail or some other means) to the customer's recipient list 490. Assembly by the customer 470 may be preferred since elimination of the factory assembly process could reduce the cost to the customer.

Figure 5:
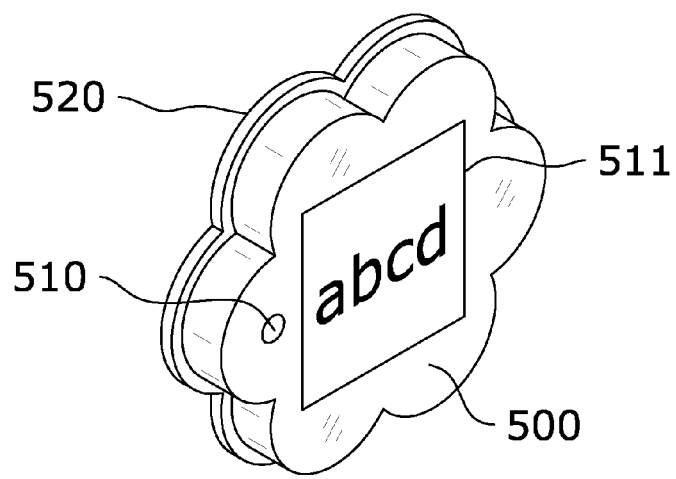
FIG. 5 is an exemplary image showing one variation of a form factor which would house the multimedia module, and provide a means to attach the multimedia module to a greeting card.

FIG. 5 is an exemplary diagram showing one variation of a form factor which could house the sound module, and provide a means to attach the sound module to a greeting card. In one embodiment, a protective cover 500 is provided to enclose the electronics of a sound module. Covers may be a variety of shapes, may be of a material permitting visible light transmittance greater than zero, and sufficient to close a light activated switch, or may be of a material permitting visible light transmittance value of zero. The example shown is not intended to be limiting. The enclosure 500 contains a top surface, a hole 510 thorough which light may penetrate to activate a light-sensitive activation circuit on a sound module, and a base 520. A display 511 may also be connected within the media module to visually display pictures and/or video media content as illustrated in FIG. 5 of the drawings.

Further, the base 520 is provided as a means to affix the enclosure, and the sound module contained within the enclosure, to the greeting card. The method of attaching the enclosure to the greeting card may be by use of an adhesive tape, a liquid adhesive, of by capturing of the larger dimension of the flange on the underside of one layer of the material used to create a greeting card while a cutout in the card material allows the enclosure to protrude through the cutout in the greeting card, die cut substantially in the shape of, and to the minor dimension of the enclosure flange. While these methods of affixing the enclosure to the greeting card are preferred, they are not intended to be limiting, and any practical method of attaching the enclosure to the greeting card is envisioned.

Figure 6:
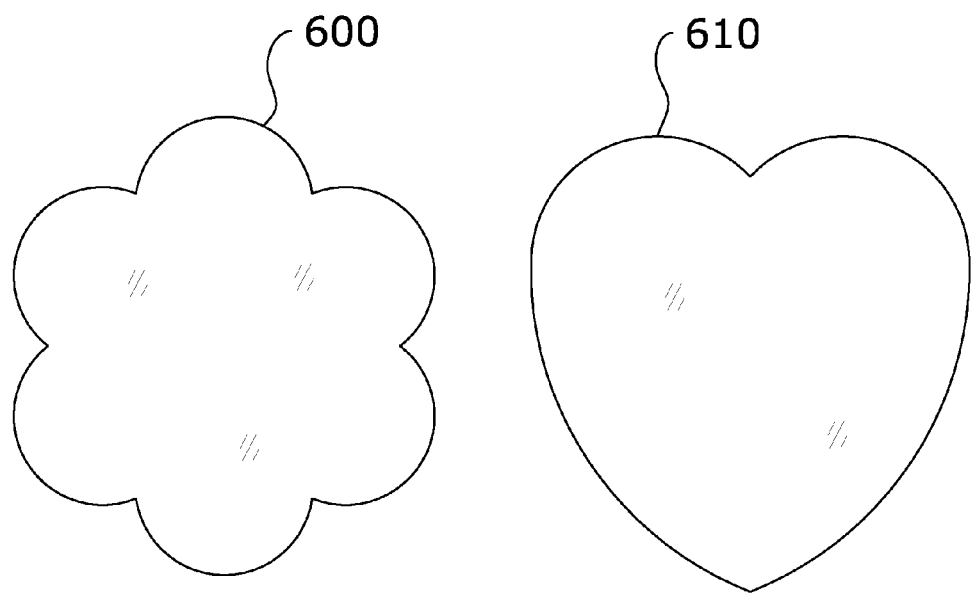
FIG. 6 is an exemplary image showing different form shapes which may be used to house a sound module.
Figure 7A:
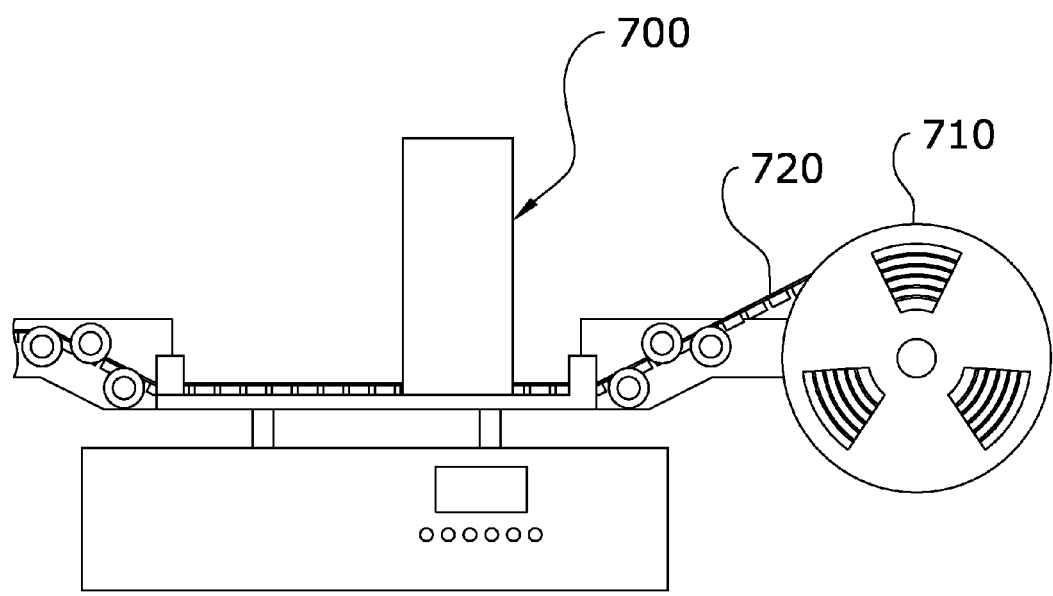
FIG. 7a is an exemplary image showing one variation of a production machine to manufacture one or more sound modules with the same, or different, audio files.
Figure 7B:
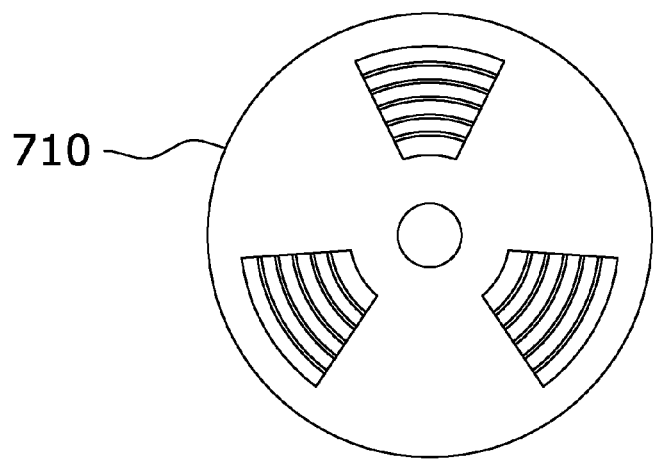
FIG. 7b is a side view of the spool.
Figure 7C:
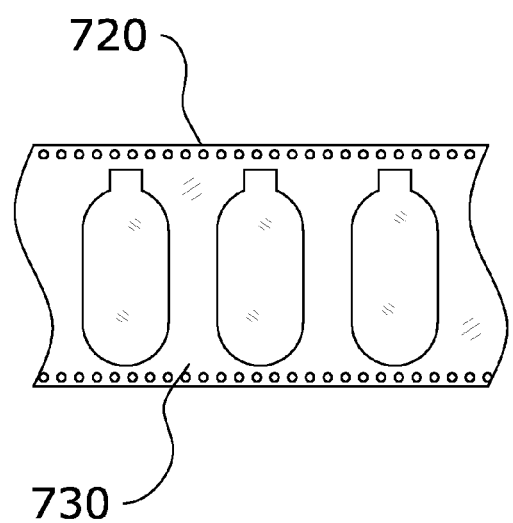
FIG. 7c is a top view of the module carrier.
Figure 7D:
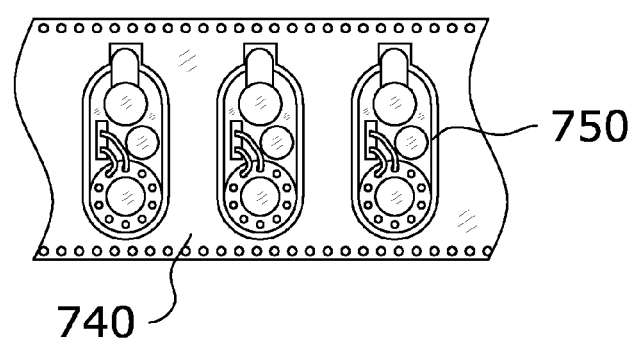
FIG. 7d is a top view of the module carrier with a plurality of media modules within the module carrier.
Figure 7E:
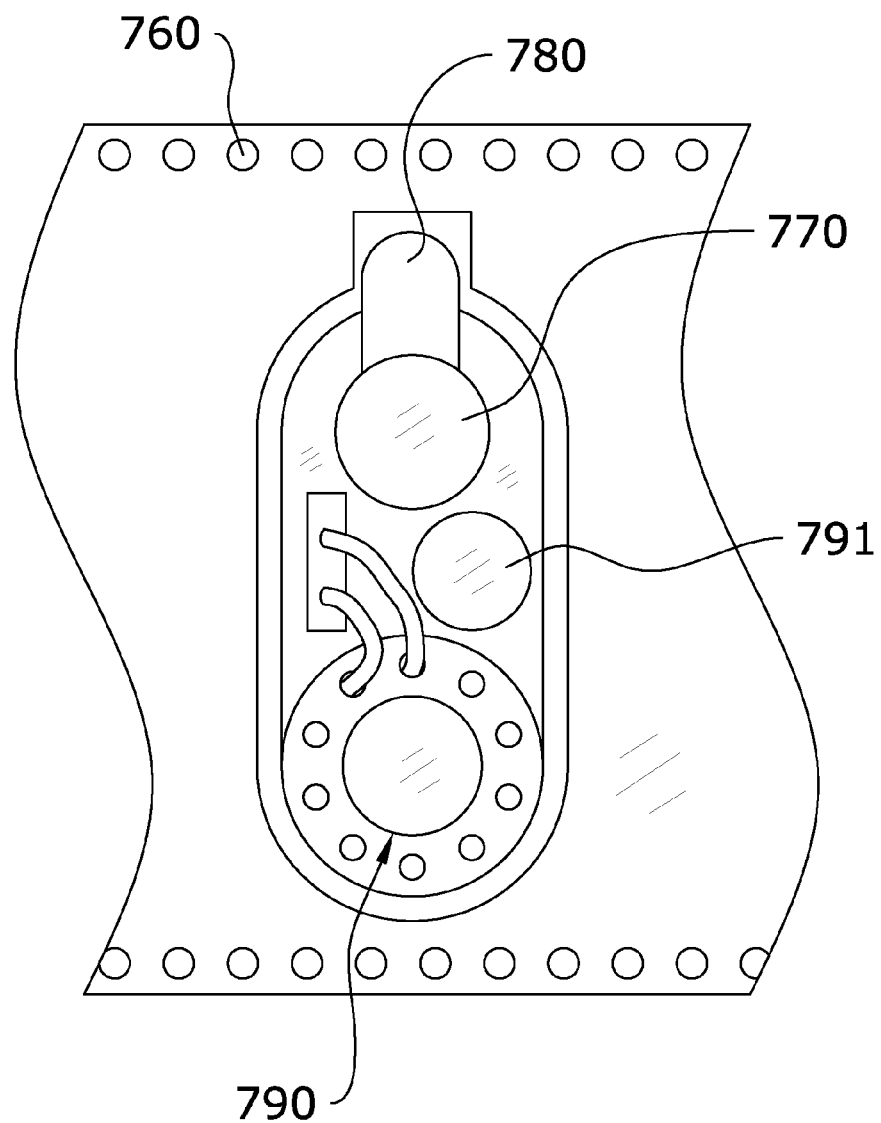
FIG. 7e is a magnified top view of a media module positioned within a cavity of the module carrier.

FIG. 6 is an exemplary diagram showing different form shapes which may be used to house a sound module. In one embodiment, an enclosure shape of a flower 600 is provided. In yet another embodiment, an enclosure in the shape of a heart 610 is provided. These embodiments are not intended to be limiting, and any shape of any depth of enclosure that may practically enclose a sound module, and be affixed to a greeting card, are envisioned. In the embodiments of FIG. 6, various graphic designs are shown. In order to create a more pleasing multimedia greeting card in which the enclosure may protrude through a cutout on the front of the card, such cutout matching the shape of the enclosure, it is desirable that the top surface of the enclosure substantially match or compliment the printed graphics shown on the front of the card.

FIG. 7 is an exemplary diagram showing one variation of a production machine 700 to manufacture one or more sound modules with the same audio file. FIG. 7 also shows different views of a multimedia module 750, a module carrier 720, and a spool 710 around which a carrier containing a plurality of modules is wound. In the drawings, a spool 710 is installed in a machine 700 used to produce multimedia modules. The carrier contains a plurality of cavity features into which multimedia modules 740 are retained prior to recording with a digital file. During production, the carrier is pulled from the spool 710 so that the modules 750 may be individually programmed, then dispensed for insertion into an enclosure 500, covering with some other method, or directly affixing to a greeting card. A series of indexing holes 760 are positioned precisely relative to the centerline of each retained multimedia module so that the module may be accurately aligned under the electronic connection means used to record the digital file upon the module.

In the drawings, a multimedia module 750 is shown, comprised of a printed circuit board, a speaker 790, a light activated switch 791, one or more batteries 770, and an insulation means 780 that interrupts the electrical circuit between the module and battery. After the digital file is recorded upon the module, but prior to installing the module on a greeting card, the insulation means is removed so that the module can be activated upon subsequent exposure to light sufficient to close the contacts on the light sensitive switch 791. Production efficiencies of a reel dispensing means allows for rapid alignment and recording of unique digital files upon a multimedia module.

Whereas one embodiment of a manufacturing device 700 to produce multiple sound modules with one sound, electronic duplicating devices are well known, and any number of configurations or types may be used. The description of the sound module recording duplication devise is not intended to be limiting.

Figure 8A:
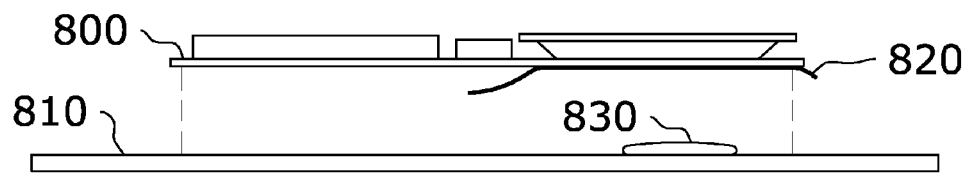
FIG. 8a is an exploded side view illustrating the multimedia module above the article (e.g. greeting card) to be attached together with a fastener (e.g. glue, adhesive tape, etc.).
Figure 8B:
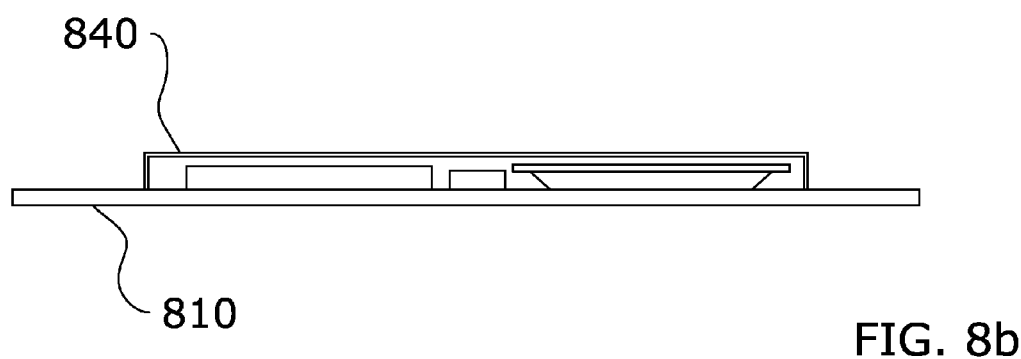
FIG. 8b is a side view showing the multimedia module attached to the article and a protective cover surrounding the multimedia module for protection.
Figure 8C:
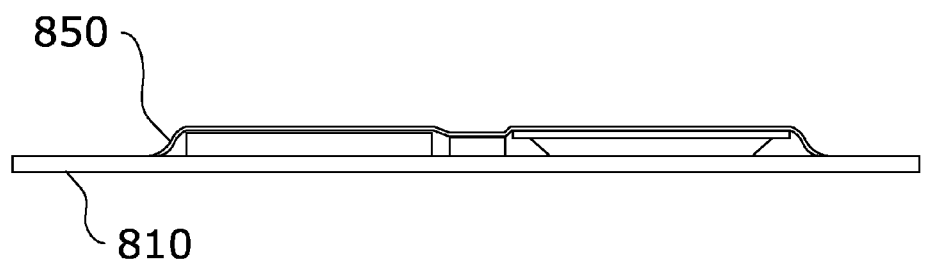
FIG. 8c is a side view showing the multimedia module attached to the article and a protective cover comprised of heat shrinkable material surrounding the multimedia module for protection.

FIG. 8 is an exemplary diagram showing various side views of a multimedia module and greeting card, methods of attaching a module to a greeting card, and methods of protecting a multimedia module prior to or after attaching a multimedia module to a greeting card.

More specifically, a multimedia module 800 is attached to a greeting card 810 by various adhesive means. For instance, a double-sided adhesive tape 820 or a small deposit of glue 830 is placed between the recorded module and the greeting card, and upon depressing the module against the greeting card, adhesively bonds the module and card together as an assembly.

The attachment means shown is not intended to be limiting, and many other assembly methods may be using, including for example, by using mechanical hardware, of by capturing the module between the greeting card surface and a second sheet of material, or a folded material, capturing the module there between.

After recording the digital file upon the module, it is preferred to protect the module from exposure to damage from being hit by, or rubbing against other materials. Damage that could result may include the dislodging of batteries from their installed positions on the module, breaking of printed circuits, or dislodging of electronic components from the printed circuit board, just to name a few. The protective cover could also be used for aesthetic purposes, being shaped like a heart for Valentine's Day, or a flower for Mother's Day.

In the drawings, a protective cover 840 is installed over the module, and attached to the greeting card 810, thereby enclosing the module in order to prevent damage. In another view, a heat shrinkable material 850 is shown encapsulating the module, substantially conforming to the exterior surfaces of the module.

If should be noted that while the drawings show the protection means being connected to the greeting card, thereby encapsulating the module there between, in the alternative, the protection means may be installed on the module first, and the encapsulated module thereafter being attached to the module.

Figure 9:
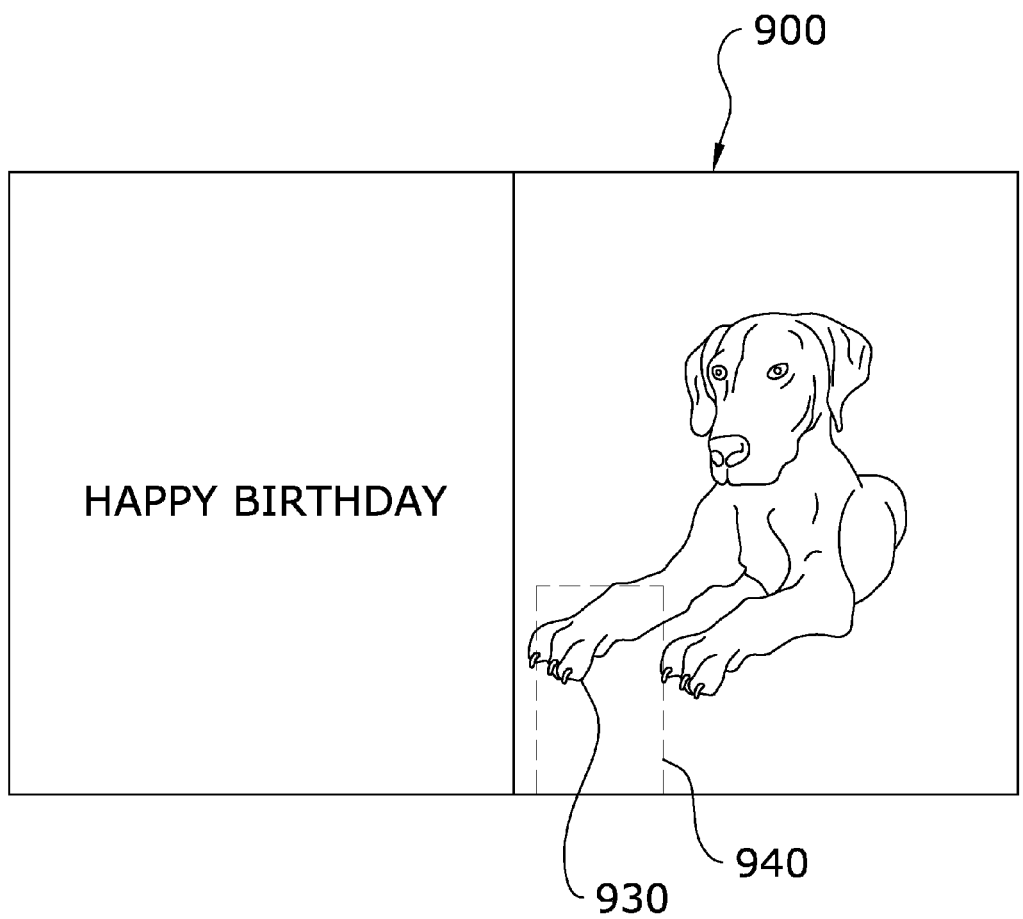
FIG. 9 is an exemplary image showing the assembly of a multimedia module to a representative greeting card, the multimedia module having been previously covered in a protective material printed to substantially match the printing on the card, and have a light transmittance sufficiently greater than zero to allow light exposure to close a light activated switch.

FIG. 9 is an exemplary diagram showing the assembly of a multimedia module to a representative greeting card, the multimedia module having been previously covered in a protective material printed to substantially match the printing on the greeting card.

In the drawings, a greeting card 900 is shown that may having printing on both sides of the fold. A completed multimedia module assembly comprised of a multimedia module and a protective printed sheet material encapsulating the module 930 is shown. The approximate outline of the module is shown by the dotted line 940 which has been added to highlight the approximate size of the module. As can be seen, the printing on the material encapsulating the module is nearly identical to the printing on the card immediately below the module.

A person who is tasked with attaching the module to the greeting card will find it easy and intuitive to place the module on the card so that the printed edges of the module align with the printed details of the card to which it will be attached.

One skilled in the art will appreciate that once the module 930 is attached to the greeting card, the printed information of the greeting card appears to be unbroken by the module overlay. This is an important innovation that allows for the entire greeting card area to be used to deliver the printed message. As can be seen, the printed material encasing the module 930 is substantially identical to the printing on the card in the area that will be covered by the module. Once the module with the printed enclosure is attached to the greeting card, the entire message is still delivered, with only a slight shadow line appearing along the perimeter of the module. However, the full message of the greeting card appears to be unbroken. The dotted line 940 illustrates the area that contains printing on both the module and greeting card.

After installation of the module on the greeting card shown, the greeting card is closed, and sent to a recipient. When the recipient opens the card, they will be able to read the entire message on the right side of the card, despite the fact that the printing in the area 940 is on two different surfaces. As the card is unfolded, light penetrates through small holes in the protective material encapsulating the module, or alternatively penetrates the light-transmitting material encapsulating the module 930, thereby activating the photo activates switch on the module, initiating playback of the digital file recorded thereon. Alternatively, an activation member 1011 connected between the two sides of the card may be pulled during the opening thereby activating a switch within the media module 930 that activates the playing of the media content (audio, video or both).

Although specific embodiments have been illustrated and described herein, it will be appreciated by those of ordinary skill in the art that a wide variety of alternate and/or equivalent implementations may be substituted for the specific embodiments shown and described without departing from the scope of the present disclosure. This application is intended to cover any adaptations or variations of the embodiments discussed herein.

Further, by separating a greeting card from the sound module, and making both components available to a consumer separately, significant savings in production cost, assembly costs, inventory losses, and retail floor space rental costs, are realized when compared to the prior art.

Still further, the mix-and-match combinations available to a customer under the present invention offer a very large number of possible greeting card combinations that would be practically impossible to offer through traditional greeting card point of sale systems.

And finally, one skilled in the art will appreciate the commercial value in a printed greeting card onto which a printed multimedia module is applied, whereupon the printing on the greeting card and module being nearly identical, thereby making the module assembly blend entirely with the greeting card upon which it is attached.

Figure 10A:
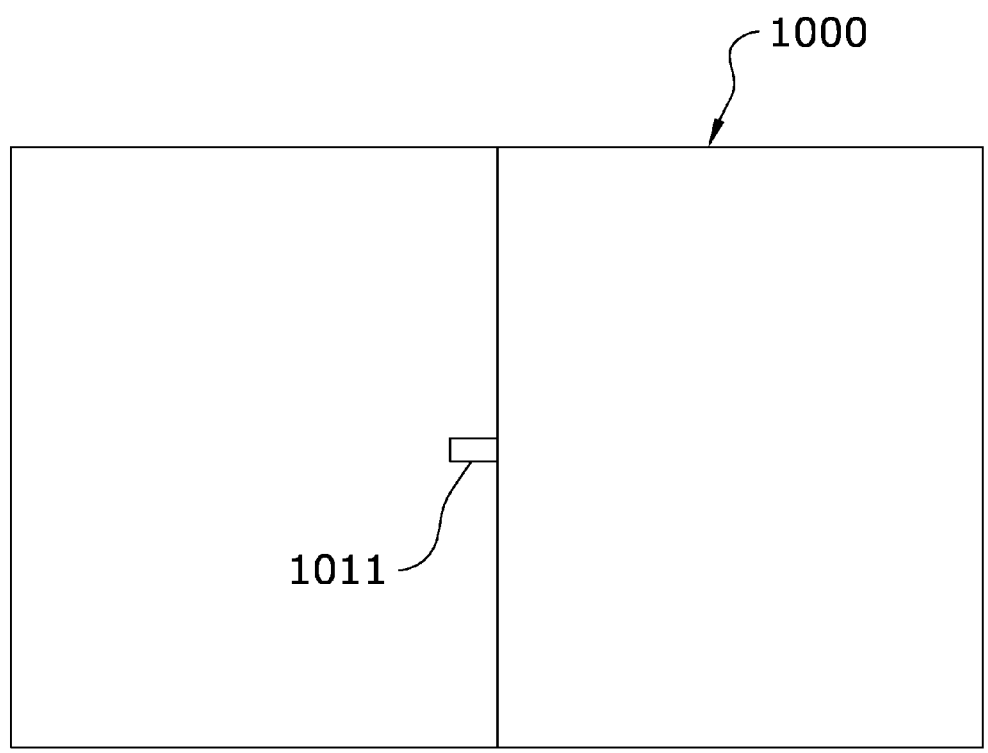
FIG. 10a is a front view illustrating a conventional multimedia card in an open state showing the sliding contact attached between the two panels for activating the media module.
Figure 10B:
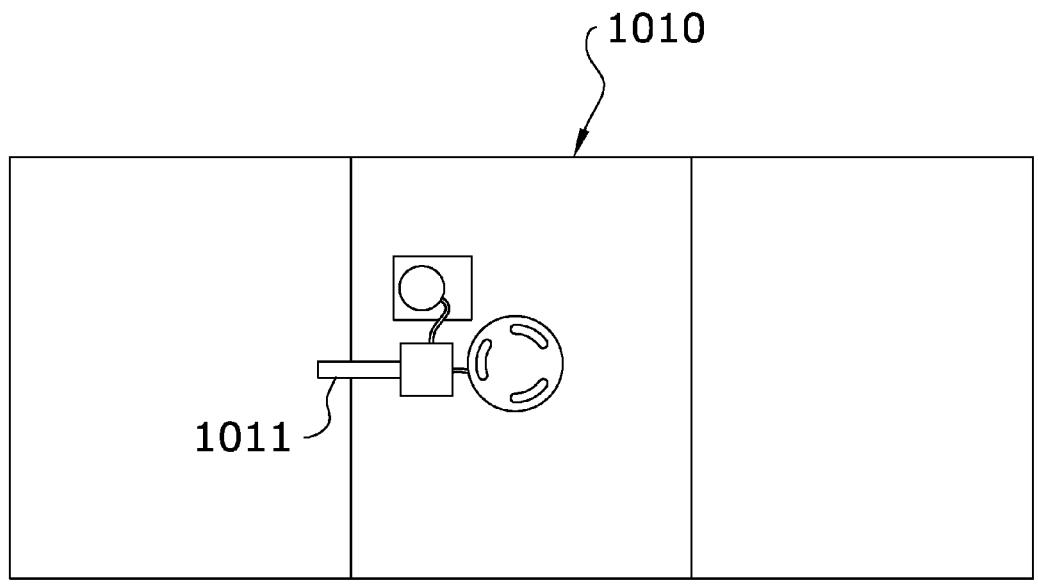
FIG. 10b is a front view illustrating a conventional multimedia card in an unassembled state with the sound module revealed.

FIG. 10 is an exemplary diagram showing a traditional, representative greeting card in an open state 1000, and the same card shown with the extra flap peeled back to reveal the location, attachment, and assembly of a self-recordable sound module 1010.

Multimedia greeting cards traditionally contain three primary elements: (1) a greeting card, (2) a sound module containing a recorded sound (or a microphone means to record a sound), batteries, a speaker, and a switch to activate the sound, and (3) an electrical switch activation means installed upon the greeting card such that the activation and playing of the sound occurs when the greeting card is opened to be read by the recipient. Activation means may include sliding insulators, sliding contacts, light or pressure sensitive switches, a switch activated by sound, or other mechanical, optical, electrical, or wirelessly communicated means of activation. The card in FIG. 10 is triggered by a sliding insulator. These activation means are all well known in the industry.

As a point of clarification, the attachment of a sound module to a greeting card of the traditional type 1010 is a precision process. When assembled in a factory, it is required that the sound module be affixed in a precise location so as to ensure that the activation means will be activated precisely when and how it's intended. Failure to properly locate the sound module upon the greeting card will result in premature activation and loss of battery life while the card is in storage, failure to play back the sound precisely when intended, or other failure points.

It should be clearly understood that placement of the current invention, a separate multimedia module upon a greeting card eliminates the problems of traditional module placement and assembly.

Figure 11:
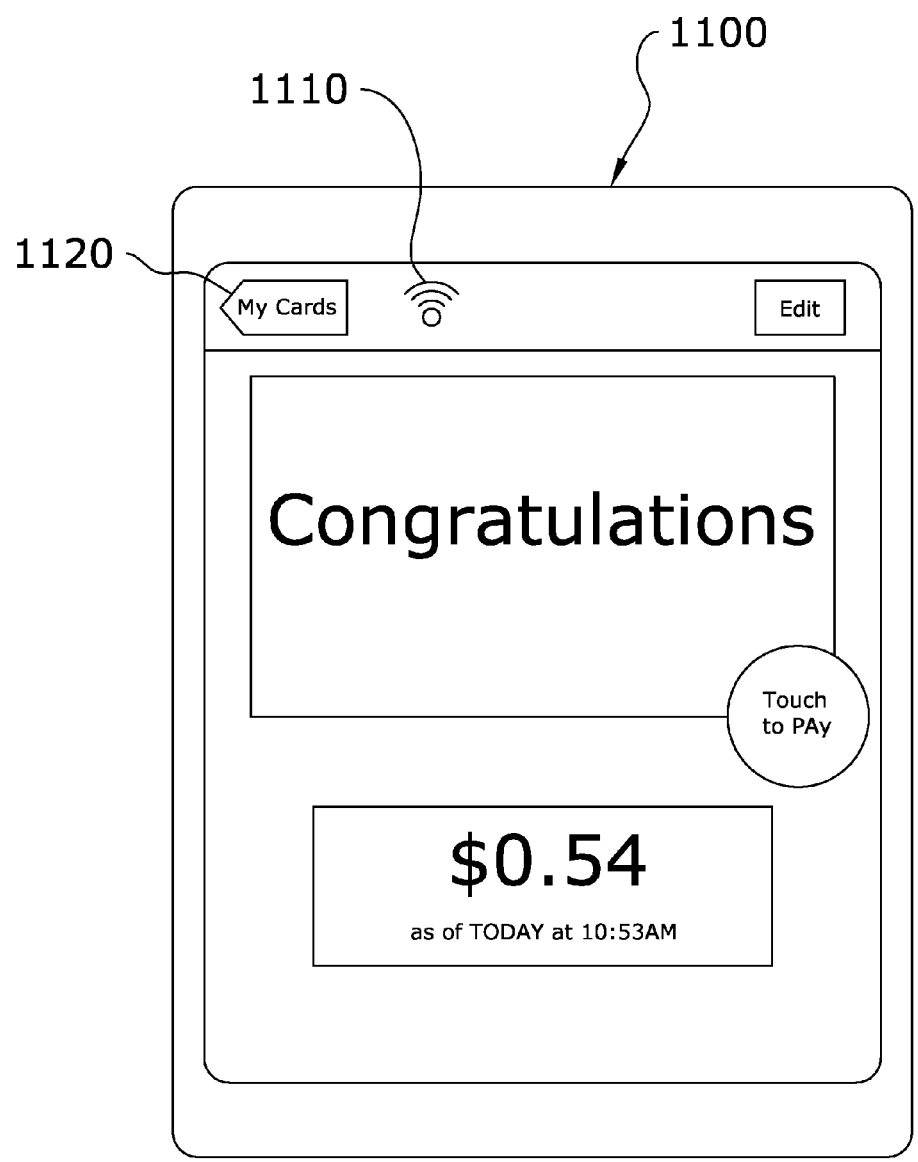
FIG. 11 a diagram showing one variation of a software application that facilitates the purchase of a customized multimedia card or multimedia modules.

FIG. 11 is an exemplary diagram showing one variation of a software application installed on an electronic device to facilitate the purchase of a customized greeting card and sound module.

In one embodiment, a customer may install an application on an electronic devise, for example, an iPhone. At the point of purchase location, the customer may activate the software 1100 application, and begin interfacing with the greeting card point of sale system. Functions that may be included in the software application may include, but clearly are not limited to, browsing or searching the images of all greeting cards offered, selecting a greeting card, browsing or searching pre-recorded multimedia files offered, listening to a multimedia sample of the files offered, recording a personal audio or video file, uploading an audio or video file to the point of purchase device, conducting a purchasing transaction, saving a card and sound file combination 1120, or entering shipping or delivery address information.

The interface between an electronic device and the point of purchase device may be through a wire, or wirelessly 1110.

Given the significant improvement in cost-effective manufacturing efficiencies, assembly processes that are highly intuitive to the assembler, the ease of purchasing, and payment efficiency advantages of smartphone and other inexpensive or free software applications, the description of the present invention is not meant to be limiting in any way. Indeed, as hand-held devices and software applications continue to mature, the present invention specifically envisions that more and more functions traditionally conducted at greeting card manufacturing facilities, or traditionally conducted at retail points of sale, will become more cost effective and efficient when incorporated into consumer hand-held devices.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of customizing an article with media content, comprising:
   selecting an article by a customer, wherein said article has a closed state and an open state;
   selecting a first media module by said customer, wherein said first media module includes a first media content;
   wherein said first media module is comprised of a control unit, a battery, a sound module and a light activated switch;
   wherein said first media content is comprised of an audio content, wherein said sound module audibly plays said first media content when said light activated switch is exposed to light, wherein said light activated switch is exposed to light when said card is in open state; and
   assembling said first media module with said article, wherein said step of assembling is comprised of physically attaching said first media module to said article;
   wherein said article is comprised of a greeting card and a protective sheet covering said first media module, wherein said greeting card has printing on a first interior surface of said first panel and a second interior surface of said second panel, wherein said first media module is attached to said first interior surface of said first panel, wherein said protective sheet includes a plurality of small holes, wherein said plurality of small holes in said protective sheet allow light through said protective sheet and to said light activated switch.

2. The method of claim 1, wherein said first media content is comprised of pre-recorded media content.

3. The method of claim 1, wherein said first media module is comprised of a video module and wherein said first media content is comprised of a video content, wherein said video module visually displays said first media content.

4. The method of claim 1, wherein said first media module is comprised of a multimedia module, wherein said first media content is comprised of a multimedia content, wherein said multimedia module is adapted to play said multimedia content.

5. The method of claim 1, including the steps of selecting a second media module including a second media content by said customer and assembling said second media module with said article.

6. The method of claim 1, including the step of embedding said first media content within a first media module.

7. The method of claim 6, including the step of purchasing said article and said first media content, wherein said step of purchasing occurs before said step of embedding said first media content.

8. The method of claim 6, including the step of dispensing said first media module to said customer.

9. The method of claim 8, wherein said step of dispensing said first media module occurs after said step of embedding media content.

10. The method of claim 1, wherein said step of selecting a first media content is comprised of said customer providing said first media content to be embedded upon said first media module.

11. The method of claim 1, wherein said step of assembling is performed by said customer.

12. The method of claim 1, wherein said step of selecting an article is comprised of selecting a selected article from a plurality of article styles.

13. The method of claim 1, wherein said step of selecting a first media content is comprised of selecting a selected media content from a plurality of media content.

14. The method of claim 1, wherein said first media module is comprised of a read/write module.

15. A method of customizing an article with media content, comprising:
   selecting an article from a plurality of articles by a customer, wherein said plurality of articles are comprised of a plurality of cards having at least two different designs, wherein said article has a closed state and an open state;
   selecting a first media module by said customer from a plurality of media modules, wherein said plurality of media modules include different media content and wherein said selected first media module includes a first media content;
   purchasing said article and said first media content by said customer;
   embedding said first media content within a first media module, wherein said first media module is comprised of a control unit, a battery, a sound module and a light activated switch, wherein said first media content is comprised of an audio content, wherein said sound module audibly plays said first media content when said light activated switch is exposed to light, and wherein said step of purchasing occurs before said step of embedding said first media content;
   dispensing said first media module with said embedded first media content after said step of embedding media content; and
   assembling said first media module with said article by said customer, wherein said first media module is attached to an interior surface of said article;
   wherein said article is comprised of a greeting card and a protective sheet covering said first media module, wherein said greeting card has printing on a first interior surface of said first panel and a second interior surface of said second panel, wherein said first media module is attached to said first interior surface of said first panel, wherein said protective sheet includes a plurality of small holes, wherein said plurality of small holes in said protective sheet allow light through said protective sheet and to said light activated switch.

16. The method of claim 1, including the steps of:
   opening said article into said open state thereby exposing said light activated switch to light;
   closing said light activated switch after detection of said light; and playing said audio content by said first media module after said light activated switch is closed.

17. A multimedia greeting card, comprising:

a greeting card having a first panel, a second panel foldably connected to said first panel, an exterior portion and an interior portion, wherein said greeting card has a closed state when folded and an open state when unfolded, wherein when said greeting card is in said closed state no light is allowed into said interior portion and wherein when said article is in said open state light is allowed into said interior portion;

a first media module attached to said greeting card having a first media content comprised of an audio content, wherein said first media module is comprised of a control unit, a battery electrically connected to said control unit, a sound module in communication with said control unit and a light activated switch in communication with said control unit, wherein said light activated switch is positioned within said interior portion of said greeting card;

wherein said sound module audibly plays said first media content when said light activated switch is exposed to light, wherein said light activated switch is exposed to light when said greeting card is in open state;

wherein said greeting card has printing on a first interior surface of said first panel and a second interior surface of said second panel, wherein said first media module is attached to said first interior surface of said first panel; and a protective sheet covering said first media module, wherein said protective sheet includes a plurality of small holes, wherein said plurality of small holes in said protective sheet allow light through said protective sheet and to said light activated switch.

18. The multimedia greeting card of claim 17, wherein said protective sheet including printing nearly identical to printing on said first interior surface below said first media module.

* * * * *